Patented June 10, 1941

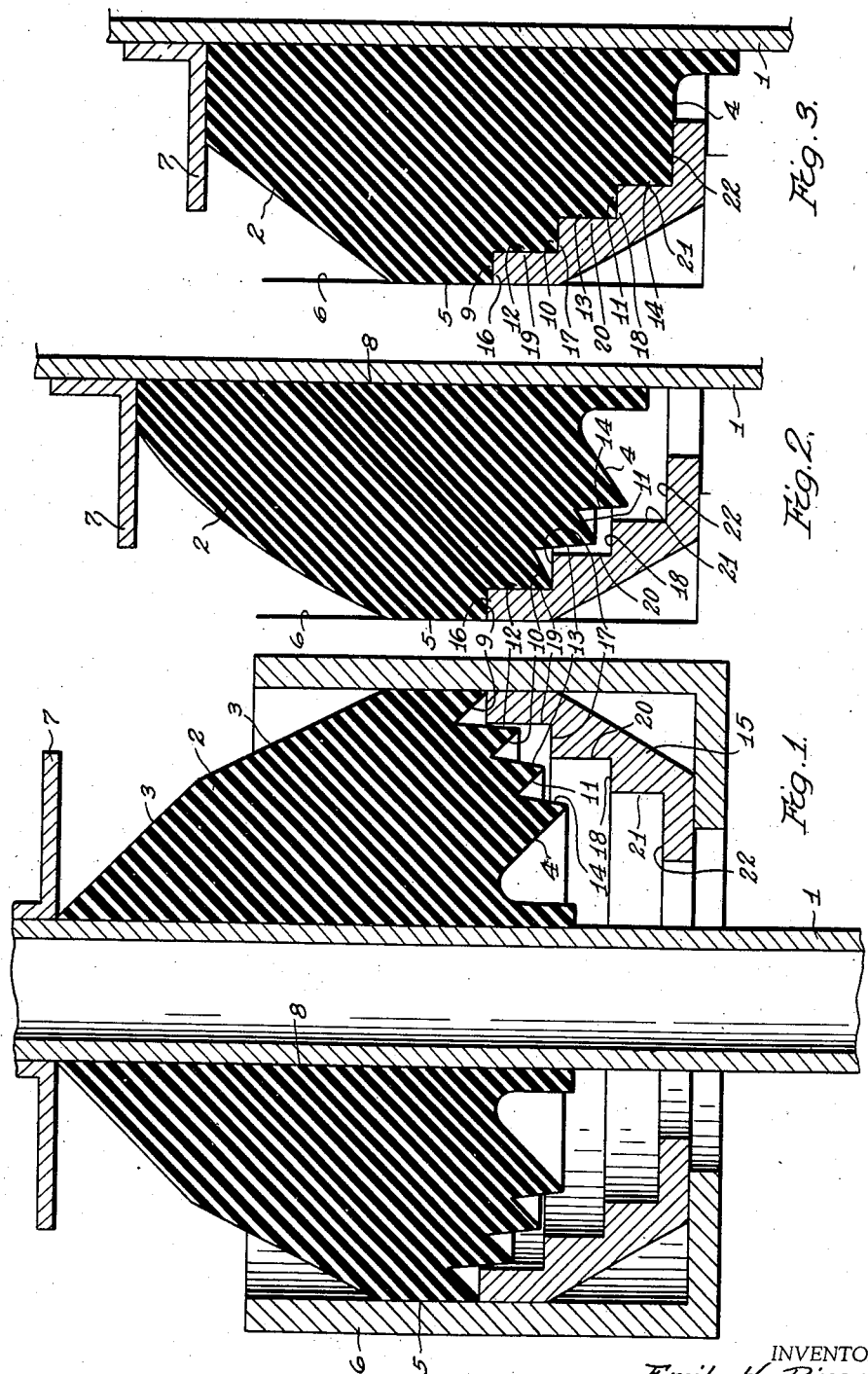

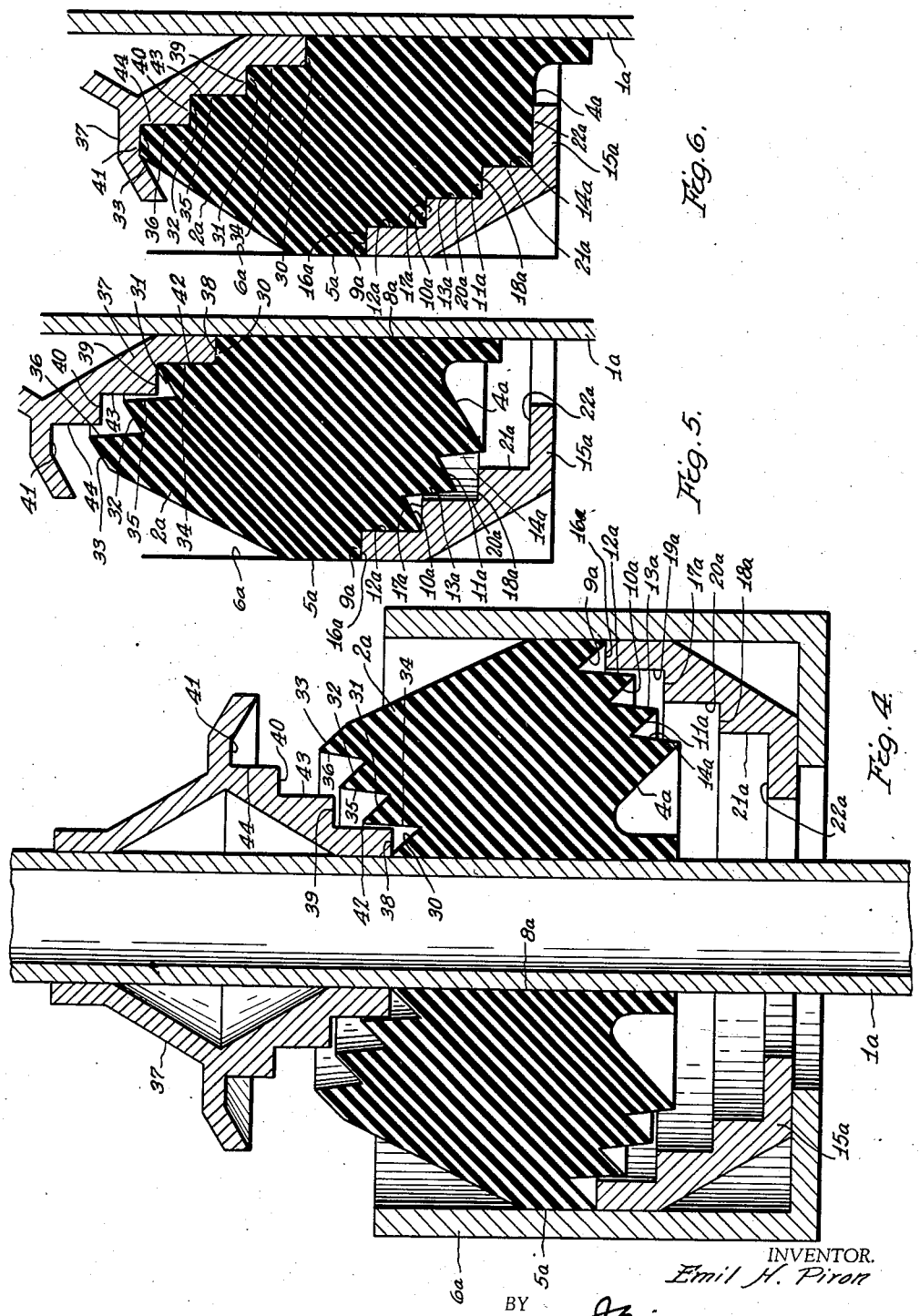

2,245,296

UNITED STATES PATENT OFFICE 2,245,296

SPRING

Emil H. Piron, New York, N. Y., assignor to Transit Research Corporation, a corporation of New York Application December 13, 1939, Serial No. 309,056

15 Claims. (Cl. 267—63)

This invention relates to springs of the type shown in my prior application Serial No. 247,437, filed December 23, 1938, and, similarly to my prior invention, has for its primary object to provide a spring having an elastic springing medium in which distortions resulting from loading consist of a combination of compression, shear and bending strains.

Another object is to provide an elastic spring in which the main deflections are in shear and bending while its support and loading are produced by compressive means. In this respect this invention more specifically aims to provide an alternative structure embodying characteristics similar to my prior invention, by a construction better suited for operation under conditions which might be termed unfavorable to the first invention.

Another object is to provide an elastic spring embodying means for limiting strains of the elastic material in the load supporting as well as in the load receiving region when such strains reach a maximum predetermined value. In respect to this object, as in the case of the preceding object, the invention here relates to an alternative form of spring, which in some respects constitutes an improvement on my prior spring in that it is better suited for certain conditions of operation. The main functional difference over the prior spring results from a different arrangement of the deflection limiting means, which differences will become apparent from the detailed description which follows.

Another object is to provide an elastic spring embodying a plurality of individual load receiving and load supporting regions and means for limiting distortion of the elastic material in each region successively as the supported load increases. As a first region is subjected to a safe maximum load, it becomes stabilized against further distortion, following which other regions are each successively subjected to an added load and successively become stabilized when the loads added thereto reach a predetermined safe maximum value. This permits not only limiting the stresses in these regions, but also to increase the angularity, i. e. the ratio $$\frac{dL}{dD}$$

(the derivative $d$ of the load L, with respect to the derivative $d$ of the load deflection D), of the load deflection curve as the load increases, a characteristic often very desirable and which is explained further hereinafter.

Another object is to provide an elastic spring embodying stepped load imposing portions and stepped load supporting portions on the load receiving member, the two sets of portions being adapted to contact and apply the load on the load supporting steps consecutively as the spring deflects in the presence of loading. In my prior invention, above referred to, the load imposing member comprises a shaft which is the load receiving member, a cylinder coaxial with the shaft which is the load supporting member, and the springing medium which comprises a mass of rubber of substantially frusto-conical form. The load imposing member has stepped portions which coact with stepped portions on the elastic springing medium to accomplish the above mentioned function. According to this invention the load imposing member may be in the form of a plane surfaced "umbrella", or a stepped "umbrella" as heretofore used, and the load supporting member has internal steps which coact with external steps on the springing medium.

In the case of stepped portions at both the top and the bottom of the spring a variation in the load deflection curve exists as compared to that of a spring having stepped portions at the top only, or at the bottom only. With the steps being so proportioned that they become successively effective in the presence of predetermined loads, the presence of two sets of steps permits increase of the deflection of the load imposing member with respect to the load supporting member for a given load.

Springs of the type wherein a mass of elastic material, such as rubber, is placed between two stiff concentric load imposing and load receiving members are well known to the art, and it is also well known that when rubber alone is used in such a spring axial loading on one member causes uneven distortion of the rubber. If the rubber is placed between the load imposing and load receiving members for straight shear loading the lack of high initial compression in a radial direction will cause the rubber to separate from the load imposing and load receiving members, thereby causing a change from day to day in the characteristics of the spring, and early destruction as a result of separation may be expected. Further, fatigue and overstressing of the rubber in certain regions and understressing it in other regions causes the rubber to deteriorate rapidly, as also does failure to provide means insuring uniform strain under shear stresses. These difficulties are completely obviated by the invention here disclosed.

As a proposed solution to the problems of the conventional spring above mentioned additional cylinders of metal are used to form a spring composed of a multiplicity of rubber cylinders interposed between a multiplicity of metallic cylinders. Obviously, such a construction adds to the expense of the spring, both as to the cost of parts and the cost of assembly, which expense is avoided by the formation of a spring capable of being molded and incorporating no metal parts whatever.

In the case of a spring having cylindrical metal inserts there is a tendency for the rubber to separate therefrom as the result of rust, and rust is very difficult to avoid because of the fact that most cities using street cars with this type of spring use salt in the winter time for melting the snow. The salt water and slush splashed on the springs quickly causes rusting thereof.

From the foregoing comparison with conventional springs known to the art, it becomes apparent that one of the most important improvements or advances over the prior art is in the provision of a rubber spring which is so designed that it does not require the use of imbedded metal cylinders, because such cylinders, although they amounted to a substantial improvement in the art themselves, are a source of trouble as well as a source of expense. As to the prior spring having no imbedded cylinders, the invention provides, in addition to limiting stresses as above mentioned, a spring so constructed that it does not tend to separate from the load imposing and receiving members.

It is further pointed out that springs having imbedded metal cylinders with end flanges have been heretofore used, and actual measurements show that a spring in which the rubber and metal have separated has a relatively large permanent set as compared with its original condition, and that distortion of the rubber, after separation, takes place by compressive action of the flanges rather than by the shearing action of the vulcanized surfaces. This reduces elasticity, or increases the load deflection ratio of the spring, whereas by providing a design wherein the metal cylinders are eliminated the invention provides a spring whose load deflection ratio remains constant.

Other objects and advantages will become more fully apparent as reference is had to the accompanying drawings wherein my invention is illustrated, and in which:

Fig. 1 is a vertical section of a spring illustrating a single set of coacting stepped portions on the elastic element and load supporting member, Fig. 2 is a diagrammatic sectional view illustrating the spring partially loaded, Fig. 3 is a view, similar to Fig. 2, illustrating the spring fully loaded, Fig. 4 is a vertical section of a spring, illustrating a double set of coacting stepped portions on the load imposing member and elastic element, and on the elastic element and load supporting member, Fig. 5 is a diagrammatic sectional view illustrating the spring of Fig. 4 partially loaded, and Fig. 6 is a view, similar to Fig. 5, illustrating the spring fully loaded.

Referring first to Fig. 1, 1 designates a shaft of metal or its equivalent, surrounded by an elastic springing element 2, of rubber or its equivalent. The element 2 is, generally, frusto-conical at its top surface 3 and at its bottom surface 4 and has its outer peripheral portion 5 supported in a metal cylinder 6 which constitutes the load supporting member. Above the element 2, and secured to the shaft 1, is an "umbrella" 7, which is in the form of a radially extending flange. The element 2 has a cylindrical inner periphery 8 in contact with the shaft 1 which, with the umbrella 7, constitutes the load imposing means.

Between the lower edge of the conical bottom surface 4 and the lower edge of the cylindrical portion 5 is formed a multiplicity of steps. The steps are designated 9, 10 and 11, and each step is of downwardly enlarging frusto-conical shape. The risers or surfaces between respective steps, designated 12, 13 and 14, are of upwardly enlarging frusto-conical form.

Within the bottom portion of the load supporting member 6 is an element 15 having internal steps, or what might be termed a multiplicity of cylinders progressively increasing, step by step, in diameter. The steps, or surface portions connecting the ends of the cylinders are designated 16, 17 and 18, respectively, and the risers between the steps, or cylinders proper, are respectively designated 19, 20 and 21. At the bottom of the smallest or lowermost cylinder 21 is an additional step 22. The surfaces 19, 20 and 21 may be replaced by frusto-conical surfaces upwardly enlarging at a small conical angle, in which case the conical angle of the frusto-conical surfaces 12, 13 and 14 must be increased in the same proportion.

In Fig. 1 the spring is shown in an unloaded position, with the steps 9, 10 and 11 of the element 2 disposed above the steps 16, 17 and 18, respectively, of the load supporting member. During the first stage of loading, as illustrated in Fig. 2, the step 9 deflects and contacts progressively the load supporting step 16, causing deflection not only of the first step 9 but also of the whole spring. The conical step 9 is deflected until it lies flat upon the step 16, in complete contact therewith over the entire area thereof, thereby causing the load to be substantially equally distributed on the step. During this deflection of the spring the upwardly enlarging frusto-conical surface 12 distorts and progressively approaches the surface 19, and by the time surface 9 lies flat on surface 16, contact is completely established between surfaces 12 and 19. At this stage in the loading the frusto-conical step 10 on the element 2 has moved to a position where its lower edge is just contacting the step 17 and the first step which comprises the surfaces 16 and 19 is thus completely brought into action while the action of the second step 17—20 is just about to start. This marks the completion of the first stage in the loading of the spring.

As the load increases and the spring deflects further the step 10 and step 17 come into complete contact, and the frusto-conical riser surface 13 comes into contact with the cylindrical surface 20. This completes the second stage in the loading of the spring. As the load continues to increase the step 11 contacts the step 18 and the frusto-conical surface 14 contacts the cylindrical surface 21 at the completion of the third stage.

In the final stage of loading, shown in Fig. 5, the conical surface 4 engages the step 22 and that portion which contacts therewith applies equally on the entire surface of the step.

The initial angularities of the conical steps and conical risers are chosen to provide load transmitting surfaces having areas in selected proportion to the load conditions under which the spring is required to operate.

In the case of the risers 12, 13 and 14, it is evident that an effect of the bending distortion is to straighten them as the load increases, while in the case of the steps 9, 10, 11, the effect of the distortion in shear combined with the distortion in bending is to flatten them as the load increases. The angularities of steps and risers are chosen so that, first, the surfaces 9 and 12 come completely into contact respectively with the surfaces 16 and 19 when the load reaches a first predetermined limit; second, the surfaces 10 and 13 come completely into contact with the surfaces 17 and 20 when the load increases, over the first load limit above, and reaches a second predetermined limit; third, the surfaces 11 and 14 come completely into contact with the surfaces 18 and 21 when the load increases over the second load limit above, and reaches a third predetermined limit; fourth, the surface 4 comes completely into contact with the surface 22 when the load increases over the third load limit above, and reaches a fourth predetermined limit.

The predetermined limits are generally chosen so that the first load limit is the maximum load which can be resisted safely by the surface of the step 9; the second load limit being a load comprising the first load limit and a load increase which can be resisted safely by the surface of step 10; the third load limit being a load comprising the second load limit and load increases which can be resisted safely by the surface of step 11; and, the fourth load limit being a load comprising the third load limit and a load increase which can be resisted safely by the portion of surface 4 which contacts with surface 22.

The dimension, angularities and respective location of the conical steps and risers are determining factors in the form of the load deflection curve. The spring can be compared to a thick circular plate of non-uniform thickness, loaded at its central region and supported at its peripheral region. It is well known that the stress distribution and the strains and deflection of such a plate vary according to whether the peripheral edge and the edge of the central hole are free or firmly held or built in, the former with the support, the latter with the load imposing member. A cylindrical rubber spring, for instance, with a coaxial central hole whose walls are vulcanized to a coaxial cylindrical load imposing member and with a cylindrical peripheral surface vulcanized to the corresponding surface of the load supporting member responds elastically to the load and deflects as a thick circular plate, the peripheral edge and the edge of the central hole of which are built in rigidly with the load supporting and load imposing members. The deflection of such a plate is considerably smaller, or its rigidity is considerably greater than that of a similar plate whose peripheral and central edges are not built in with the loading members but are left free to distort.

In the case of the present invention, the spring follows the laws which govern the deflection of a circular plate with free edges, as long as the risers are not engaged and do not contact the corresponding walls of the load imposing and supporting members. As soon as such contact begins, however, free distortion of the elastic material is restricted in the contact region and the behaviour of the spring approaches more and more that of the plate with built in edges, as the edge restrictions increase with the number and the area of the surfaces of contact. The result is that the stiffness of the spring, i. e., the ratio $$\frac{dL}{dD}$$

of the load increment $dL$ to the deflection increment $dD$ increases with the load, and that the rate at which that increase takes place depends on the difference of angularity between the risers and corresponding surfaces of the loading members, and also on the dimension and location of the risers.

If the angularity is small, contact is established sooner and the deflection restricting action starts at an early stage of loading, i. e., at low load and if the risers are high and located at a greater distance of the neutral fiber of the spring in bending their deflection restricting action is larger and the rate at which the stiffness of the spring is increased is larger.

The width and location of the steps has a similar action. As more of the step surfaces 9, 10, 11 and 4 come in contact with the corresponding surfaces 16, 17, 18 and 22, the smaller becomes the distance between the cylindrical area at which the load is imposed and that at which the load is supported. This distance is an important factor of the deflection in shear and bending of the spring. Therefore, the larger are these steps and the nearer they are located to the center of the spring, the greater is the rate at which the stiffness of the spring increases with the load.

From this, it is seen that the steps and risers have all the same general effect, namely, they permit limiting of the distortion of the elastic material in their region and, therefore, to reduce the amount of elastic material used in such regions, proportionally to the chosen limit, thereby increasing the deflection or the softness of the spring accordingly under loads below the chosen limit. That is to say, at low loads, they make it possible to obtain large rates of increase of spring stiffness in a convenient manner under increasing loads and, finally, they increase the ultimate load capacity of the spring by stopping the distortion of the portions of the spring designed for softness under low loads when such loads pass the capacity limit of such portions.

From this it is seen that the number of steps and risers and their angularities and location must be chosen so as to obtain the desired form of load deflection curve and that their distribution about the load imposing or about the load supporting member or about both these members must be varied according to the intended use of the design, so as to provide an arrangement which achieves the desired result.

In the present spring, as in the prior spring above referred to, stabilization takes place in a given region while the loading of that region is still of safe value, prevention of further distortion causes stabilization of reactions, and that region of the spring which has received a given load maintains the distribution of its reactions against that load when other loads are added to other regions of the spring. In this respect the two springs are similar. However, the peculiarities in function pointed out above clearly indicate that the function of the earlier spring is radically modified by the arrangement here shown.

Figs. 4, 5 and 6 illustrate the application of the principles involved in the present application combined with those disclosed in my prior application above referred to for the purpose of further modifying the action of the spring. As is hereinafter described more particularly, the spring shown in Figs. 4, 5 and 6 has step and riser portions adjacent the outer periphery and also adjacent the inner regions and the resulting load deflection curve is, therefore, different than can otherwise be obtained.

The formation of the lower or outermost steps and risers is identical to those of the first described form and, therefore, in the interest of brevity, the same reference characters and the above descriptive matter apply to Figs. 4, 5 and 6, with the exception that the reference numerals each have the prime character "a" applied thereto. In other words, parts 1a, 2a, etc., in Figs. 4, 5 and 6 correspond identically to the parts 1, 2, etc. of Figs. 1, 2 and 3.

The top portion of the element 2a is formed with a plurality of steps 30, 31, 32 and 33, each of which has the shape of a downwardly enlarging frusto-cone. The risers, or surfaces between respective steps, designated 34, 35 and 36, are of upwardly enlarging frusto-conical form.

Secured upon the shaft 1a is a a load imposing member 37 having a multiplicity of steps or progressive cylinders of increasing diameter. The steps or surfaces connecting the cylinders are designated 38, 39, 40 and 41, respectively, and the risers between said steps or cylinders proper are respectively designated 42, 43 and 44.

Fig. 4 illustrates the spring in an unloaded position, with the load imposing steps 38, 39, 40 and 41 disposed vertically above the load supporting steps 30, 31, 32 and 33 respectively. During the first stage of loading as illustrated in Fig. 5, the load imposing step 38 contacts the first load receiving step 30, causing deflection of the step 30 until it is in complete contact with the step 38. The upwardly enlarging conical surface 34 is deformed and comes into contact with the cylindrical surface 42. As the load is increased, the step 39 contacts the step 31 and the conical surface 35 is deformed and engages the cylindrical surface 43. Next, the step 40 engages the step 32 at which time the conical surface 36 engages the cylindrical surface 44. Finally, the step 41 engages the step 33, as illustrated in Fig. 5.

Although specific embodiments of the invention have been illustrated and described, it will be understood that various changes may be made in the details of construction without departing from the spirit of the invention as indicated by the appended claims, and such changes are contemplated.

What is claimed is:

1. A spring comprising concentric load imposing and load supporting members separated by a springing means composed of elastic plastic material, said springing means being stepped in a radially inward direction from its external periphery for a portion of its radial length, the outer of said members contacting said external periphery and being stepped radially inward therefrom, the steps of said inner member being adapted to surface contact progressively the steps of said springing means under increasing loading.

2. A spring comprising concentric load imposing and load supporting members separated by a springing means composed of elastic plastic material, said springing means being stepped in a radially inward direction from its external periphery for a portion of its radial length, the outer of said members contacting said external periphery and being stepped radially inward therefrom, the steps of said inner member being adapted to surface contact progressively the steps of said springing means under increasing loading, said springing means also being stepped in a radially outward direction from its inner periphery for a portion of its radial length, the inner of said members contacting said internal periphery and being stepped radially outward therefrom, the steps of said inner member being adapted to surface contact progressively the steps of said springing means under increasing loading.

3. A spring comprising concentric load imposing and load supporting members separated by a springing means composed of elastic plastic material, said springing means being stepped in a radially inward direction from its external periphery for a portion of its radial length, the outer of said members contacting said external periphery and being stepped radially inward therefrom, the steps of said inner member being adapted to surface contact progressively the steps of said springing means under increasing loading, said springing means also being stepped in a radially outward direction from its inner periphery for a portion of its radial length, the inner of said members contacting said internal periphery and being stepped radially outward therefrom, the steps of said inner member being adapted to surface contact progressively the steps of said springing means under increasing loading, said radially inward length and said radially outward length being correlated with the total radial length of the spring in such manner that the oppositely extending steps overlap.

4. A spring comprising concentric load imposing and load supporting members separated by a springing means composed of elastic plastic material, said members upon relative axial loading movement imposing a combination of shear and bending stresses on said springing means according to a load deflection ratio which increases as the intensity of such movement increases, and means at the outer periphery of said springing means limiting the deflection of one portion of said springing means in shear and bending, that portion of said springing means thereafter resisting loading by compression while the remainder thereof continues to deflect by shear and bending.

5. A spring comprising concentric load imposing and load supporting members separated by a springing means composed of elastic plastic material, said members upon relative axial loading movement imposing a combination of shear and bending stresses on said springing means according to a load deflection ratio which increases as the intensity of such movement increases, means near one end and at the outer periphery of said springing means limiting the deflection of a portion adjacent the outer periphery of the springing means in shear and bending, and means near the other end and the inner periphery of said springing means limiting the deflection of a portion adjacent the inner periphery of the springing means in shear and bending, both portions of said springing means thereafter resisting loading by compression.

6. A spring comprising concentric load imposing and load supporting members separated by a springing means composed of elastic plastic material, said members upon relative axial loading movement imposing a combination of shear and bending stresses on said springing means according to a load deflection ratio which increases as the intensity of such movement increases, means near one end and at the outer periphery of said springing means limiting the deflection of a portion adjacent the outer periphery of the springing means in shear and bending, and means near the other end and the inner periphery of said springing means limiting the deflection of a portion adjacent the inner periphery of the springing means in shear and bending, said two limiting means overlapping, both portions of said springing means thereafter resisting loading by compression.

7. A spring comprising concentric load imposing and load supporting members having a springing element of elastic plastic therebetween, said element having a cylindrical outer surface, said element being stepped radially inward from its outer periphery, the steps being frusto-conical in form and the step connecting surfaces resulting from formation of the steps being frusto-conical, the outer of said members contacting the elastic plastic at said outer surface and having a progression of steps equal in number to those on said elastic plastic.

8. A spring comprising concentric load imposing and load supporting members having a springing element of elastic plastic therebetween, said element having a cylindrical outer surface, said element being stepped radially inward from its outer periphery, the steps being frusto-conical in form and the step connecting surfaces resulting from formation of the steps being frusto-conical, the outer of said members contacting the elastic plastic at said outer surface and having a progression of steps equal in number to those on said elastic plastic, each of the last named steps being normal to the axis of said members with the risers therefrom being of cylindrical form, the steps of said outer member progressively surface-contacting the steps of said elastic material under relative axial loading.

9. A spring comprising concentric load imposing and load supporting members having a springing element of elastic plastic therebetween, said element having a cylindrical outer surface, said element being stepped radially inward from its outer periphery, the steps being frusto-conical in form and the step connecting surfaces resulting from formation of the steps being frusto-conical, the outer of said members contacting the elastic plastic at said outer surface and having a progression of steps equal in number to those on said elastic plastic, each of the last named steps being normal to the axis of said members with the risers therefrom being of cylindrical form, the steps of said outer member progressively surface-contacting the steps of said elastic material under relative axial loading, and the frusto-conical risers on the elastic plastic progressively contacting the cylindrical risers on said outer member.

10. A spring comprising concentric load imposing and load supporting members separated by a springing means of elastic plastic material, said springing means having cylindrical inner and outer peripheries, said springing means being stepped radially outwardly from the inner periphery and at one end thereof, said springing means being stepped radially inwardly from the outer periphery and at the other end thereof, and steps on the concentric members adapted to surface contact progressively respective steps of said springing means under increasing loading.

11. A spring comprising concentric load imposing and load supporting members separated by a springing means of elastic plastic material, said springing means having cylindrical inner and outer peripheries, said springing means being stepped radially outwardly from the inner periphery and at one end thereof, said springing means being stepped radially inwardly from the outer periphery and at the other end thereof, the distance said steps extend outwardly and inwardly being such that they overlap.

12. An elastic element for a spring, a cylindrical mass of elastic plastic material having a central opening therethrough, one end surface of said mass being a frusto-cone, and a stepped surface connecting the larger end of said frusto-cone to the outer cylindrical surface of said mass.

13. An elastic element for a spring, a cylindrical mass of elastic plastic material having a central opening therethrough, one end surface of said mass being a frusto-cone, and a stepped surface connecting the larger end of said frusto-cone to the outer cylindrical surface of said mass, each of the steps of said stepped surface being V-shape in any cross section taken radially of said mass.

14. An elastic element for a spring, a cylindrical mass of elastic plastic material having a central opening therethrough, one end surface of said mass being a frusto-cone, and a stepped surface connecting the larger end of said frusto-cone to the outer cylindrical surface of said mass, the other end surface of said mass being composed of two reverse frusto-cones with one of said cones being substantially shallower than the other and stepped.

15. An elastic element for a spring, a cylindrical mass of elastic plastic material having a central opening therethrough, one end surface of said mass being a frusto-cone, and a stepped surface connecting the larger end of said frusto-cone to the outer cylindrical surface of said mass, the other end surface of said mass being composed of two reverse frusto-cones with one of said cones being substantially shallower than the other and stepped, each of the steps of the two stepped surfaces being V-shape in any cross section taken radially of said masses.

EMIL H. PIRON.